Figure 1:
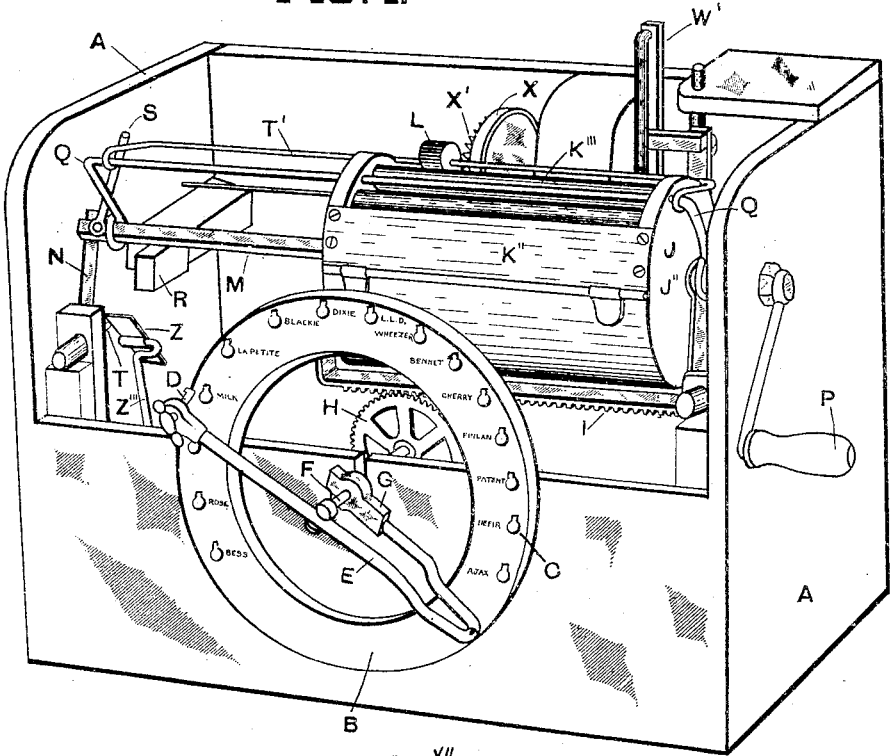

No. 808,091. PATENTED DEC. 26, 1905.
W. A. KENNEDY.
WEIGHT REGISTERING MECHANISM.
APPLICATION FILED AUG. 8, 1904.

2 SHEETS—SHEET 1.

WITNESSES
Albert Nathan
Irene Reynolds

INVENTOR
Wm. A. KENNEDY,
By Fetherstonhaugh & Co
Attys

No. 808,091. PATENTED DEC. 26, 1905.
W. A. KENNEDY.
WEIGHT REGISTERING MECHANISM.
APPLICATION FILED AUG. 8, 1904.

2 SHEETS—SHEET 2.

WITNESSES
INVENTOR.
WM. A. KENNEDY.

UNITED STATES PATENT OFFICE.

WILLIAM ALBERT KENNEDY, OF APPLE HILL, CANADA.

WEIGHT-REGISTERING MECHANISM.

No. 808,091.  Specification of Letters Patent.  Patented Dec. 26, 1905.

Application filed August 8, 1904. Serial No. 219,996.

*To all whom it may concern:*

Be it known that I, WILLIAM ALBERT KENNEDY, a subject of the King of Great Britain, residing at Apple Hill, in the Province of Ontario and Dominion of Canada, have invented a new and useful Weight-Registering Mechanism, of which the following is a specification.

My invention relates, broadly, to improvements in that class of mechanical devices which have for their object the registration of the individual masses of various objects, and more especially to mechanisms of the type designated as "weight-registering" devices, which provide means whereby the weights of varying loads may be automatically and acurately determined, especially such as are designed more particularly to meet the requirements of persons engaged in a lacteal business, and it substantially comprises the general construction and combination of parts presently to be set forth.

Every person skilled in the arts to which my invention appertains appreciates the advantages of having some means which, while composed of the fewest parts and of the greatest simplicity of design, will nevertheless accurately and easily produce a record of such objects as are weighed by the same.

It is essential for the proper management of large dairy farms and other businesses depending upon milk from cows that the producing rate of each cow be carefully recorded for frequent consideration, as it is evident that economy and competition will not permit of the caretaking and feeding of non-producing animals. It has hitherto been a difficult matter to do this because of the practical difficulties in the way; and it is therefore a main object of my invention to formulate a device which will in a more or less automatic manner materially assist in the production of such a record and which will do so with as little manipulation as possible.

It is also an object of my invention to provide a mechanism adapted and intended to register and record the weight of each load automatically regardless of the fact that the loads may be of varying sizes, weights, and quantities.

Another object of my invention consists, therefore, in the skilful and systematic arrangement or adaption of a complete weight-registering means for the attainment of a device which will be of few parts, capable of economical construction, and which permits of being easily assembled into an operative form of great compactness, occupying a minimum amount of space and so constructed as to permit of ready inspection of the essential elements thereof and at the same time present a form which, because of its great simplicity of operation, will be easily and effectively understood and controlled by all those using the same.

A further object of my invention is a construction embodying the foregoing advantages which will be always ready for immediate operation without any trouble other than the application of the masses to be recorded to the proper members thereof with an accompanying elementary motion of the proper handle or lever thereof.

A still further object of my invention lies in the creation of a device of the above-explained character more particularly adapted for making a record of the amount of milk produced at certain intervals by each of a number of cows or other milk-bearing animals.

Further objects and advantages will appear upon reference to the following description and claims when taken in connection with the accompanying drawings, in which like letters of reference denote corresponding parts throughout all the figures, of which—

Figure 2:
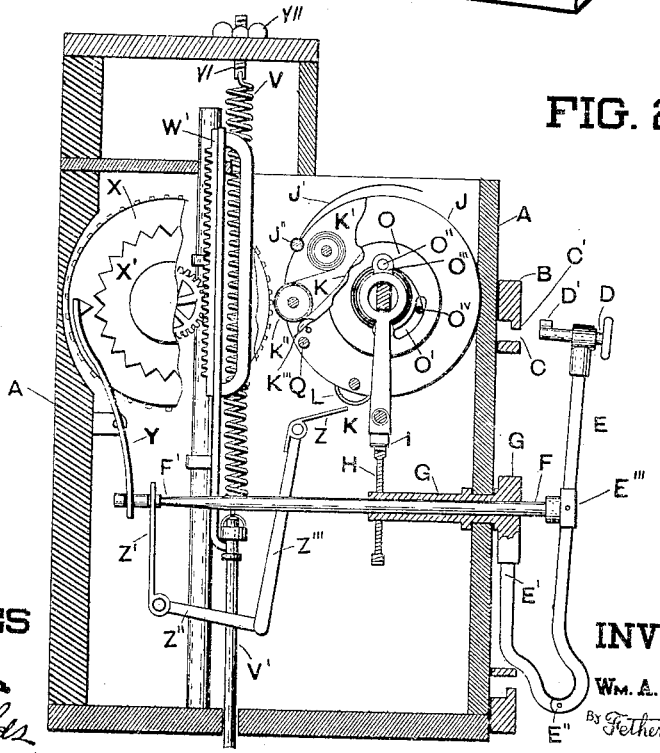
Figure 3:
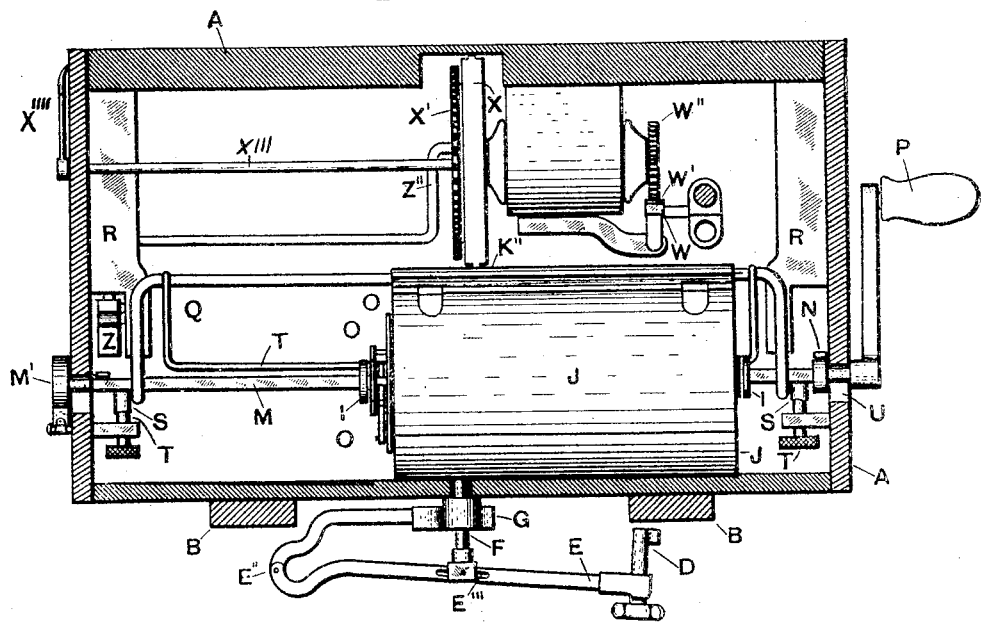
Figure 4:
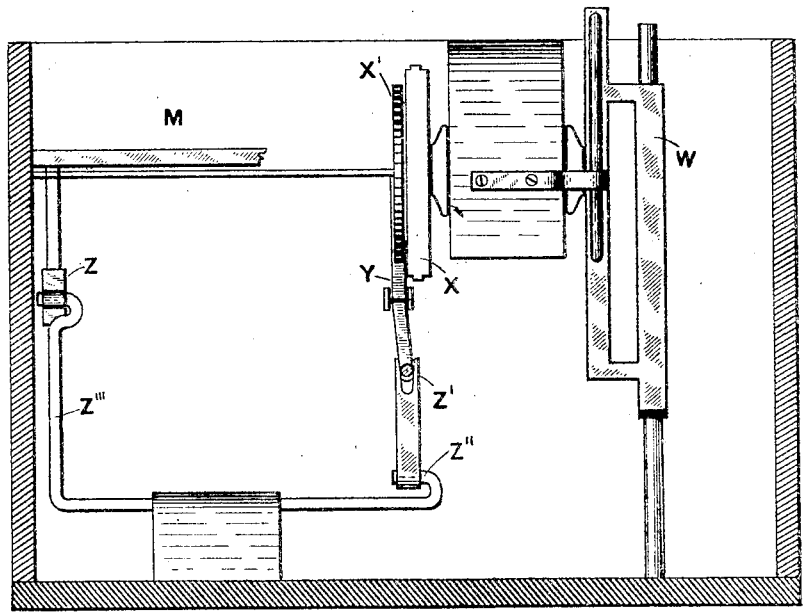

Figure 1 is a general detail in perspective with certain exterior coverings removed, thereby giving an insight into the general arrangement of some of the operative elements. Fig. 2 represents a detail in elevation, showing certain parts in section. Fig. 3 is a plan of the same, partly in section. Fig. 4 represents a front elevation of my device, showing, as in the previous figures, parts in section.

As I have shown by the figures, the operative elements of my invention may be substantially encompassed for convenience and protection by a suitable casing A, which preferably I embody in a form so devised as to offer facilities for easy removal of certain detachable parts, thereby affording a ready inspection of its inclosures. Upon an exterior face of such casing, which for convenience I will designate as a "front" face, I provide a means which may be operated to control the position of the registration upon the record-paper. This I will now describe in detail.

*Carriage-shift.*—This consists, essentially, of a dial B, which may be of any design preferred or, as I have shown in my drawings, in the likeness of an annular ring. Upon such dial I provide subdivisions (shown by C) which are distinguished by designations relating to the cows or other sources of the products, the masses of which are to be recorded through the instrumentality of my invention. Such subdivisions I prefer to have so designed that they will permit of a temporary fixed engagement with an indicating-lever of some desirable construction. In Figs. 1 and 2 I have illustrated such a fabrication, and upon reference thereto it will be seen that I employ a key D, which is provided with a suitable projection D', and model the subdivision C in the form of cavity, so shaped that it will receive the key D and permit same to be rotated therein to a sufficient extent to securely lock it in place against the shoulder C'. It is to be understood, however, that many ways of accomplishing such temporary engagements are known and used in the various trades and that I do not limit myself to the use of such forms as are shown by these figures. This key D is revolubly or otherwise suitably mounted upon an arm E, which is hinged to an adjacent arm E' at the point E" and is furthermore fixed to the end of the laterally-movable shaft F by means of a slot-and-pin bearing, as shown at E'''. By such an artifice all movements of the arm E about the hinge E''' result in a proportional lateral movement by suitable bearings provided in the casing front A, this being shown more particularly in Fig. 2. The member G, extended, carries affixed thereto a gear H. It will thus be seen from the foregoing that parts H, G, E', and E are capable of revolution together. It will now be understood that all variation in the position of such arm E will result in a corresponding relative rotation of the gear H, the latter in turn transforming such rotation into a translation of the meshing rack I, which, because of the upturned engaging arms I', will carry with it the record-carriage J.

*Carriage.*—The carriage, which I have designated by J, in my present adaptation carries three rollers K', K", and K''', respectively, K' being a roller carrying a reserve supply of paper K, upon which the records are to be made, while the roller K", over which such paper passes, serves as a backing for holding such paper for the impression of the type mounted upon the contacting type-wheel, presently to be described, and the roller K''' serves to hold such paper tightly upon the roller K". This paper K is fed into a suitable chamber and may be removed therefrom by raising the lid J', as is partially shown in Fig. 2, such lid being hinged upon the periphery of the record-carriage J at J".

Passing through the carriage is a revoluble shaft M, rectangular in cross-section, so mounted that the shaft is free to revolve and slide therein, this being accomplished by the bore of the carriage being of sufficient diameter to permit of the revolution of the shaft therein. Such revolution, however, is limited to a certain extent by the plate O, having the circumferential slot O'. Such plate has an aperture corresponding to the cross-section of the shaft, which will permit it to slide but not revolve thereon. In order to further increase the strength and stability of this limiting structure, it is mounted, by means of pins or rivets O", to the piece O''', having a similar shaft-aperture. Between the two I station a coiled spring fastened at one end to this structure O and at the other end embracing a pin O'''', mounted on the end of the carriage within the circumferential groove O'. Thus it will be seen from what has been heretofore described that this mechanism will permit of a limited rotation of the carriage about the shaft against the tension of the coiled spring, but owing to the latter the general tendency of the carriage will be to retain the relative position shown in Fig. 2. A rotation of the handle P, which is mounted upon the end of the shaft M, will cause a rotation of the carriage substantially therewith, which rotation, however, will be checked when the rod Q, which is revolubly mounted upon the shaft M and slidably mounted in the periphery of the carriage, comes into contact with the lug R, it being shown in such position in Fig. 3. Upon continuing the rotation of the handle after such contact the arm S, which is firmly fixed to the shaft M, will swing about the same into abutment with the stop T, as shown more clearly in Figs. 1 and 2. When such contact ensues, the shaft M will be forced to assume a forward position in the laterally-extended bearing U, within which it is mounted. (See Fig. 3.) A spring M', as shown in Fig. 3, tends to return the handle to its original position. It will thus be seen that simply by a partial rotation of the crank P the carriage will be revolved until the record-roll K" is opposite the indicating or imprinting wheel, and then by a further slight movement of this handle it will be moved laterally against the same. Without any alteration in its angular position the proper imprint will be made upon the record-paper, and upon raising the handle P this cycle will be reversed. It is to be noted that such imprinting-wheel should preferably be freshly inked prior to each contact, and for the attainment of such end I employ a suitable inking-roll L, revolubly affixed against lateral displacement upon the supporting-rod T', which latter is joined to the rod Q and is so journaled in the periphery of the carriage that the latter may freely slide along the rod T'.

*Weight-indicating mechanism.*—I will now describe the means I employ for imprinting proper digital characters designating weights upon the record-paper. For the purpose of obtaining a relative movement of my device which will be proportional to the weight to be recorded I employ a properly-constructed spring V, which is swung at its upper end from a perpendicularly-adjustable rod V', mounted, as will readily be seen by inspection of Fig. 2, in a bearing arranged for the purpose. The rod V' is threaded, as shown, so as to engage with the thumb-screw V''', bearing upon the outside of the casing. The lower end of the spring is united to a rod V', whose lower end is made in a form suitable for affixing the buckets or weights to be attached thereto. This stem V' is suitably fastened to the rack-bearing plate W, which latter is so mounted as to permit of a vertical movement only, whereby the rack W', mounted thereon, will be continually in mesh with the corresponding gear W''', all as appears in the drawings. This gear is fixed upon a shaft X''', mounted in antifriction-bearings, and at the other end carries two wheels, the one, X, being a wheel about the circumference of which are raised imprinting numbers or characters and the other, X', being in the form of a toothed wheel. The shaft may, if desired, be extended so as to terminate in an indicating-arm X'''' upon the exterior of the casing, as shown in Fig. 3, whereby a ready and immediate inspection can be had of each of the weights which are to be recorded. This indicating-arm X'''' has a further use in my invention in that after an empty bucket or other receptacle is attached to the arm V' certain tare weight will be of course shown by such indicating-arm. It is in such an event that the thumb-screw mechanism V'' becomes of value, as by screwing up the latter the spring may be tensioned so that the indicating-arm X'''' will be brought to zero and then upon the net weight being added to the receptacle the precise and exact weight is indicated and brought into position to be recorded. I have found in practice that this adjustment is so simple and easy that it can be done frequently without any appreciable loss of time or effort.

*Locking mechanism.*—It will be understood now that unless some holding or locking means is employed the oscillations and vibrations of the weight which is hung from the spring V will render it difficult to obtain a correct imprint from the record-wheel upon the record-paper. This, however, I am able to overcome as follows: By pressing in the arm E a corresponding movement will be transmitted to the shaft F, which in turn will swing the spring-lever Y about its mounting, causing the upper end, which carries the pointed lug Y', to enter and occupy a space between the teeth upon the circumference of the toothed wheel X', thereby bringing and retaining it in a proper position, as will be easily seen by inspection of Fig. 2. I may, if desired, provide a further means for locking the shaft F into its inward position, which consists of an arm Z', provided with a slot at its upper end so designed that its uppermost portion is of the same diameter as the normal diameter shaft F, and at its lower portion it narrows down gradually to a less diameter, as will be seen by inspection of Fig. 4. This arm is mounted in suitable bearings, (not shown,) which permit of its vertical movement, while securely holding it against any transverse displacement. At its lower end it is pivotally attached to the crank-arm Z'', extending from a shaft having at its other extremity a crank-arm Z''' placed perpendicularly to the former, the whole substantially forming a bell-crank lever. As will be seen by inspection of Fig. 2, there is mounted upon the latter a catch Z, which permits of a downward movement of its long arm from the position there shown, but an upward movement thereof will be checked by the abutment of its short stop-lug against the arm Z'''. The operation of this catch mechanism is as follows: By pressing in the arm E at any desired circumferential point shaft F is moved laterally, so that the depression therein F' will pass into the slot in arm Z', the latter, immediately rising, embracing the reduced shaft portion within narrow part of the slot in its upper end, and thereby bring this end against the offset shoulder of the depression F', thus effectually preventing the latter from a lateral outward movement. The carriage now upon being swung into operative position by the shaft M, the latter will carry with it the arm S, which will contact in its revolution with the long arm of Z, thereby depressing the latter without disturbing the angular position of the arm Z'''. When, however, the proper imprint has been made and the carriage released and returned to its former position, this arm S in its upward movement will engage with Z; but because of the construction heretofore described this will not permit of any backward rotation about its pivotal connection to the arm Z''' and will therefore swing the latter arm back and, as will be seen, release the shaft F, so that it may return to its original forward position.

It is apparent from the preceding that I have attained the essential desideratum of an automatic weighing-machine of the present type whereby the same is provided with a weighing mechanism embodying a load-receiver movable different distances corresponding to the loads weighed, the same being, furthermore, provided with a registering mechanism having varying registering movements corresponding to the varying movements of the load-receiver which, essentially, consists of a recorder controlled and operated by the weighing mechanism for registering or recording the exact amount of each one of a series of varying loads.

Having thus described my invention so that the same will be readily understood and capable of being constructed and put into operation by those skilled in the arts to which it appertains, what I claim, and desire to secure by Letters Patent, is—

1. A weight-registering mechanism comprising a record-carriage revolubly longitudinally and laterally movable, means for producing and limiting such movement and means for weighing and recording weights upon such record-carriage and tare-eliminating means therefor, substantially as described.

2. A weight-registering mechanism comprising a record-carriage capable of a revoluble and longitudinal movement, actuating and limiting means therefor, a weight-operated device for positioning characters, and means for imprinting such characters upon such carriage, substantially as described.

3. In combination a longitudinally-movable record-carriage, means for producing and limiting such movement and weight-operated means for positioning characters representing the respective weights against such carriage, substantially as described.

4. In a weight-registering mechanism, the combination of the revoluble shaft, and record-carrying carriage arranged for rotation and translation thereon, transversely-widened bearings within which said shaft is journaled and means for revolving said shaft and transversely moving it across the width of said bearing, substantially as described.

5. A weight-registering mechanism comprising in combination a revoluble shaft, a record-carrying carriage slidably arranged thereon and revoluble therewith, transversely-extended bearings within which said shaft is journaled for rotation and translation therein and means for producing such movement, substantially as described.

6. In combination, a revoluble and transversely-movable shaft, a record-carrying carriage arranged thereon bearings within which said shaft is journaled whereby such movement is provided for and means for revolving said shaft and transversely moving it upon said bearing, substantially as described.

7. A weight-registering mechanism comprising an index-pointer, a record-bearing carriage upon a shaft and revoluble independently thereof, means for revolving said carriage and transversely moving same into contact with an imprinting mechanism and a weight-adjustable mechanism for controlling such imprinting mechanism, substantially as described.

8. A weight-registering mechanism comprising a dial, an index-pointer thereon, a record-bearing carriage movable proportionally by such pointers, means for revolving said carriage and transversely moving same against a recording mechanism, such recording mechanism for printing upon said carriage and a means for relatively shifting said recording mechanism proportionally to weights applied thereto.

9. In a weight-registering mechanism, an index-pointer a record-bearing carriage longitudinally shiftable by the latter, means for revolving said carriage and transversely moving same against a registering mechanism, means for relatively shifting said registering mechanism proportionally to weights applied thereto and means for locking same in alining positions, substantially as described.

10. In a weight-registering mechanism, a sleeve revolubly mounted but laterally affixed within a suitable support, a shaft extending therethrough and revoluble therewith but longitudinally free to move therethrough, an index-pointer hinged to said sleeve and controlling the longitudinal movement of said shaft and means for locking such shaft against such longitudinal movement, substantially as described.

11. A weight-registering mechanism comprising in combination, a sleeve a revolubly-mounted shaft longitudinally movable therethrough and revoluble therewith, a pointer hinged to said sleeve member and controlling the longitudinal movement of said shaft, and a locking means for affixing said pointer opposite any one of a plurality of indicating positions, substantially as described.

12. In combination, a sleeve revolubly affixed upon a suitable support, a shaft extending therethrough, revoluble therewith but longitudinally free, an index-pointer hinged to said sleeve member and said shaft and controlling the longitudinal movement of the latter, a locking device upon the end of said index-pointer and means whereto said locking member may be affixed in a plurality of positions, substantially as described.

13. In a weight-registering mechanism, a longitudinally-shiftable and partially-revoluble record-carriage, means for longitudinally shifting said carriage into predetermined positions, a weight-operable registering means, and means for transversely shifting said carriage into contact therewith, substantially as described.

14. In combination a longitudinally-shiftable and partially-revoluble record-carriage, a record-sheet mounted thereon, means for longitudinally shifting said carriage into predetermined positions, a weight-operable indicating and imprinting means, and means for shifting said carriage into contact with said record-sheet and thereby imprinting upon the latter, substantially as described.

15. A weight-registering mechanism comprising a longitudinally-shiftable and revoluble record-carriage, a record-sheet thereon, means for longitudinally shifting and means for locking said carriage into predetermined positions, a weight-operable indicating means, a locking device therefor and means for shifting said carriage and record-sheet into contact with the imprinting-surface, substantially as described.

16. In a weight-registering mechanism, means including a wheel revoluble in proportion to the weight of bodies attached thereto, characters upon the circumference of said wheel indicating weights of the controlling bodies, means for locking said wheel against rotation, in combination with a laterally-adjustable recording-carriage movable transversely into contact therewith, substantially as described.

17. In a weight-registering mechanism means movable proportionally to weights attached thereto, a dial revoluble proportionally to the movement of said means, characters upon the circumference of said dial indicating the actuating-weights, means for locking said dial against rotation, in combination with a laterally-adjustable recording-carriage transversely movable into contact therewith, substantially as described.

18. In a weight-recording mechanism, a record-bearing carriage, a paper-supplying roller mounted thereon, a revoluble imprinting-platen around the periphery of which the paper is adapted to be passed, a friction-roller for maintaining a tension upon said paper and a chamber adapted to receive the end of the paper bearing the record, a shaft upon which said carriage is laterally movable, guide-rods slidably extending through said carriage for controlling the angular rotation thereof, extensions radially disposed to said shaft, abutments against which said extensions contact upon a partial rotation of said shaft whereby the latter will be transversely displaced upon the continued rotation thereof.

In testimony whereof I have signed my name in the presence of two subscribing witnesses to this specification.

WM. ALBERT KENNEDY.

Witnesses:
   D. D. GRANT,
   ERNEST RIOUX.